United States Patent
Theoleyre

(10) Patent No.: US 8,501,252 B2
(45) Date of Patent: Aug. 6, 2013

(54) METHOD FOR DECALCIFICATION OF AN AQUEOUS SOLUTION, IN PARTICULAR OF LACTOSERUM OR OF AN UTRAFILTRATION PERMEATE LACTOSERUM

(75) Inventor: Marc-Andrè Theoleyre, Paris (FR)

(73) Assignee: Applexion (FR)

( * ) Notice: Subject to any disclaimer, the term of this patent is extended or adjusted under 35 U.S.C. 154(b) by 816 days.

(21) Appl. No.: 10/526,827

(22) PCT Filed: Aug. 25, 2003

(86) PCT No.: PCT/FR03/02573
§ 371 (c)(1),
(2), (4) Date: Apr. 22, 2005

(87) PCT Pub. No.: WO2004/021795
PCT Pub. Date: Mar. 18, 2004

(65) Prior Publication Data
US 2006/0003052 A1    Jan. 5, 2006

(30) Foreign Application Priority Data
Sep. 6, 2002 (FR) .................................. 02 11039

(51) Int. Cl.
*A23C 9/146* (2006.01)
*B01D 15/36* (2006.01)

(52) U.S. Cl.
USPC .............................. 426/41; 426/271; 210/670

(58) Field of Classification Search
USPC ...................... 127/46.1; 210/670; 426/41, 271
See application file for complete search history.

(56) References Cited

U.S. PATENT DOCUMENTS

| 2,708,632 | A |   | 5/1955 | Stimpson |
| 4,159,350 | A | * | 6/1979 | Jonsson ........................ 426/271 |
| 5,118,516 | A | * | 6/1992 | Shimatani et al. ............. 426/271 |
| 5,443,650 | A | * | 8/1995 | Saska et al. .................. 127/46.2 |
| 6,383,540 | B1 | * | 5/2002 | Noel ............................. 426/271 |

FOREIGN PATENT DOCUMENTS

| EP | 1 053 685 A1 | 11/2000 |
| FR | 2 390 106 | 12/1978 |
| WO | WO 9904903 A1 * | 2/1999 |

OTHER PUBLICATIONS

"desalination."The American Heritage® Science Dictionary. Houghton Mifflin Company. Jan. 22, 2009. <Dictionary.com http://dictionary.reference.com/browse/desalination>.*

Houldsworth, D.W. 1980. "Demineralization of whey by means of ion exchange and electrodialysis." J. Soc. Dairy Tech. vol. 33. pp. 45-51.*

* cited by examiner

*Primary Examiner* — Nikki H Dees
(74) *Attorney, Agent, or Firm* — Gerald E. Hespos; Michael J. Porco; Matthew T. Hespos

(57) ABSTRACT

A method is provided for decalcification of an aqueous solution that has multivalent $Ca^{2+}$ and $Mg^{2+}$ cations and anions able to form complexes with at least a part of the multivalent cations. The method includes replacing at least part of the anions to form complexes of the aqueous solution by monovalent anions such as $Cl^-$, non-able to form such complexes. The method also replaces at least a part of the multivalent cations of the aqueous solution by monovalent metal cations such as $Na^+$ and/or $K^+$. This later replacement step is performed simultaneously with or after the first replacement step.

18 Claims, No Drawings

METHOD FOR DECALCIFICATION OF AN AQUEOUS SOLUTION, IN PARTICULAR OF LACTOSERUM OR OF AN UTRAFILTRATION PERMEATE LACTOSERUM

BACKGROUND OF THE INVENTION

1. Field of the Invention

The present invention relates to a decalcification method of an aqueous solution comprising multivalent cations $Ca^{2+}$ and $Mg^{2+}$ and anions able to form complexes with at least a part of said multivalent cations, such as phosphate, lactate or citrate anions.

2. Description of the Related Art

In the dairy industry, as in many other industries, the presence of calcium and/or magnesium in liquids to be treated restricts some operations and particularly the operations of concentration of these liquids.

Thus, for instance, in the case of the production of crystallized lactose from whey, the presence of calcium interferes with the concentration of this whey and limits the quality of the lactose produced due to a co-precipitation of calcium salt.

The presence of calcium and/or magnesium also restrains the use of the separation methods such as the electrodialysis or the chromatography.

Several techniques have been used in the past to eliminate the $Ca^{2+}$ and $Mg^{2+}$ ions contained in an aqueous medium.

It is in particular a question of techniques using strong cationic resins of which the counter-ion is $Na^+$ or $K^+$, for the decalcification (softening) of water or juice, in particular in sugar refinery.

The elimination of the $Ca^{2+}$ and $Mg^{2+}$ ions makes it possible to improve the performances of the methods downstream, by limiting risks of precipitation of insoluble salts.

During the water or juice percolation through these strong cationic resins, the $Ca^{2+}$ and $Mg^{2+}$ ions contained in this water or juice, are exchanged with $Na^+$ or $K^+$ ions of the resins.

When these latter are saturated, they are regenerated by the passing through them a NaCl aqueous solution or an aqueous solution containing $Na^+$ or $K^+$ ions. There is then exchange of the $Na^+$ or $K^+$ ions of this solution with the $Ca^{2+}$ and $Mg^{2+}$ ions which attached to the resins.

It will however be noted that in the case of wheys for instance, and in particular sweet wheys, the decalcification by means of cationic resins of which the counter-ion is $Na^+$ or $K^+$, following the cycle known as softening cycle, becomes difficult due to the formation of complexes between the $Ca^{2+}$ and $Mg^{2+}$ ions and the anionic portion of some acids, generally weak, of which the most well known are phosphoric acid and some organic acids such as citric acid and lactic acid.

The $Ca^{2+}$ and $Mg^{2+}$ ions thus complexed are therefore much less available for an exchange with the $Na^+$ or $K^+$ ions of the resins and the decalcification yields are therefore reduced.

In order to get round this difficulty, we had re-course to weak cationic resins, known as chelating, having more affinity with the $Ca^{2+}$ and $Mg^{2+}$ ions than the aforementioned strong cationic resins.

However, when the counter-ion of these resins is $Na^+$ or $K^+$, their regeneration is costly, because they require a first regeneration with an acid, generally hydrochloric acid or sulfuric acid, to replace by $H^+$ ions the $Ca^{2+}$ and $Mg^{2+}$ ions attached by these resins, then a second regeneration with soda or potash to replace the $H^+$ ions by $Na^+$ or $K^+$ ions.

The total demineralization of wheys is sometimes contemplated by passage in series at first through a cationic resin of which the counter-ion is $H^+$, which may be regenerated with an acid, then through an anionic resin of which the counter-ion is $OH^-$, which may be regenerated with a base.

During the percolation of wheys through the cationic resin, the $Ca^{2+}$ and $Mg^{2+}$ ions replace the $H^+$ ions attached to the resin. It results in a substantial drop of the pH of the wheys in treatment, drop which has for effect to destroy the aforementioned complexes between the $Ca^{2+}$ and $Mg^{2+}$ ions and the phosphate anions and/or the organic acid anions (lactate, citrate, etc.) contained in said wheys. These $Ca^{2+}$ and $Mg^{2+}$ ions are then available for the ion exchange.

If with such a method, an almost pure lactose solution can actually be produced, this method is nevertheless costly in chemicals and produces important volumes of effluents. Moreover, this technique is not very selective and eliminates in not very differentiated manner all the ion species whatever their impact is on the methods downstream.

SUMMARY OF THE INVENTION

The aim of the present invention is therefore to provide an effective decalcification method, but without presenting the disadvantages aforementioned of the methods previously known.

More precisely, the present invention relates to a method such as defined in the first paragraph of the present description and which is characterized in that it comprises the operations:

(a) of replacement of at least a part of said anions able to form complexes of the aqueous solution by monovalent anions such as $Cl^-$ non-able to form such complexes, and (b) of replacement of at least a part of said multi-valent cations of the aqueous solution by monovalent metal cations, such as $Na^+$ and/or $K^+$, operation (b) being performed simultaneously to operation (a) or performed on the aqueous solution having undergone operation (a).

DETAILED DESCRIPTION OF THE PREFERRED EMBODIMENT

It has actually been highlighted that the replacement of at least a part of the anions able to form complexes with the multivalent cations, by monovalent anions non-able to form such complexes, prior or simultaneously to the replacement of the multivalent cations ($Ca^{2+}$ and $Mg^{2+}$) by monovalent metal cations (e.g. $Na^+$ or $K^+$), i.e. prior or simultaneously to the actual decalcification, could greatly improve the decalcification yields.

It will actually be understood that by specifically replacing the anions forming complexes with the multivalent cations, by monovalent anions not likely to form such complexes, these complexes will more or less be destroyed and the availability of the multivalent cations of the solution to be treated will thus increase, which can therefore be replaced more easily by the monovalent metal cations of the resin.

It will be noted that in the method according to the invention, there is not exactly demineralization, but only replacement of some undesirable ions (multivalent cations) by other metal ions more neutral for the continuation of the treatment of the aqueous solution concerned.

According to an embodiment of the invention, operation (a) comprises the processing of said aqueous solution by an anionic resin of which the counter-ion is a monovalent anion non-able to form complexes with said multivalent cations, and operation (b) comprises the processing of said aqueous solution by a cationic resin of which the counter-ion is a monovalent metal cation.

It will be added that the anionic resin and the cationic resin are preferably a strong anionic resin and a strong cationic resin, respectively.

As an example of a strong anionic resin, we will note the IRA 458 resin from American company Rohm and Haas, and as an example of a strong cationic resin, we will note the SR1 LNA resin of this same company.

Moreover, when the aqueous solution to be treated further comprises monovalent anions non-able to form complexes with said multivalent cations, it will be advantageous to select as a counter-ion of the anionic resin, an anion of the same type as the monovalent anions contained in said aqueous solution.

Also, when this aqueous solution further comprises monovalent metal cations (such as $Na^+$ and/or $K^+$), it will be advantageous to select as a counter-ion of the cationic resin, a cation of the same type as the monovalent metal cations contained in said aqueous solution.

The method according to the present invention can further comprise an operation (c) of regeneration of the anionic resin and/or the cationic resin by means of a re-generation agent; this procedure may be performed in series on the anionic resin then on the cationic resin or in parallel respectively on the anionic resin and the cationic resin.

It will be specified that the regeneration agent will preferably be an aqueous solution comprising a dissolved salt of which the cation is of the same type as the monovalent metal cation forming the counter-ion of the cationic resin and/or of which the anion is of the same type as the monovalent anion forming the counter-ion of the anionic resin.

It will be noted that depending on the ionic composition of the aqueous solution to be treated, a pH adjustment of the regeneration agent can be necessary to prevent any risk of precipitation of calcium salt or insoluble magnesium. Thus, if for instance said aqueous solution to be treated contains calcium phosphate, the pH will be adjusted by adding an acid, particularly phosphoric or hydrochloric acid.

The present invention moreover comprises the use of the above method for the decalcification of whey or a permeate resulting from the ultrafiltration of a whey, this whey and this permeate comprising $Ca^{2+}$ and $Mg^{2+}$ ions, $Cl^-$ anions, $Na^+$ and $K^+$ cations and anions selected from the group consisting of phosphate anions, anions from organic acids able to form complexes with the $Ca^{2+}$ and $Mg^{2+}$ ions and their mixtures.

In such an application, the monovalent anion forming the counter-ion of the anionic resin is preferably the $Cl^-$ anion and the monovalent cation forming the counter-ion of the cationic resin is preferably the $Na^+$ or $K^+$ cation, and the regeneration agent is then preferably an aqueous solution of NaCl or any available aqueous effluent containing $Na^+$ and/or $K^+$ and $Cl^-$ ions.

The table below presents the performances obtained on a sweet whey to be decalcified, on one hand, by a treatment with a single decalcification resin (strong cationic resin: CF system) and on the other hand, with a strong anionic resin AF followed in series by a strong cationic resin CF (AF-CF system), with the fluid used for the regeneration of these resins being an aqueous solution of NaCl and/or KCl.

TABLE

| System | CF | AF-CF |
|---|---|---|
| Volume passed through the resins (in bed volumes) | 26 | 35 |
| $Ca^{2+}$ and $Mg^{2+}$ in the solution to be treated (meq./l) | 25 | 25 |
| $Ca^{2+}$ and $Mg^{2+}$ in the exit effluent (meq./l) | 6 | 2 |
| Decalcification ratio (%) | 76 | 92 |
| Effective capacity (eq./l .of cationic resin)* | 0.50 | 0.80 |
| Regeneration level (eq./l of cationic resin)** | 2.4 | 2.4 |
| Regeneration yield (%) | 20.8 | 33.3 |

*quantity of $Ca^{2+}$ and/or $Mg^{2+}$ ions fixed by liter of cationic resin
**quantity of $Na^+$ or $K^+$ ions used for the regeneration of a liter of cationic resin This table shows that the passage in series of the solution to be treated through the AC-CF system allows much higher decalcification ratios than those obtained with the CF system.

It becomes apparent also that the regeneration yield of the resins is better with the AF-CF system. This is a very important point; in fact when, for said regeneration, we only have a regeneration agent of which the monovalent anions and cations content is limited, we can avoid adding make-up monovalent anions and cations to the regeneration agent, which would be impossible to do with the use of the CF system.

The invention claimed is:

1. A decalcification method of an aqueous solution of whey or whey permeate comprising multivalent cations $Ca^{2+}$ and $Mg^{2+}$ and anions able to form complexes with at least a part of said multivalent cations, comprising the operations of: (a) replacement of at least a part of said anions able to form complexes of the aqueous solution by monovalent anions non-able to form such complexes, the replacement operation comprising processing of said aqueous solution by a strong anionic resin of which the counter-ion is a monovalent anion non-able to form complexes with said multivalent cations, (b) replacement of at least a part of said multivalent cations of the aqueous solution by monovalent metal cations by treatment of said aqueous solution by a strong cationic resin of which the counter-ion is a monovalent metal cation, wherein operation (b) is performed on the aqueous solution having undergone operation (a); and (c) regeneration of the anionic resin and/or the cationic resin by means of a regeneration agent comprising a dissolved salt of which the cation is of the same type as the monovalent metal cation forming the counter-ion of the cationic resin and/or of which the anion is of the same type as the monovalent anion forming the counter-ion of the anionic resin.

2. The method according to claim 1, in which said aqueous solution further comprises monovalent anions non-able to form complexes with said multivalent cations, wherein said monovalent anion forming the counter-ion of the anionic resin is of the same type as the monovalent anions contained in the aqueous solution.

3. The method according to claim 2, in which the aqueous solution further comprises monovalent metal cations, wherein the monovalent metal cation which is the counter-ion of the cationic resin is of the same type as the monovalent metal cations contained in the aqueous solution.

4. The method according to claim 1, wherein regeneration operation (c) comprises treatment in series of the anionic resin then of the cationic resin.

5. The method according to claim 1, wherein regeneration operation (c) comprises the treatment in parallel of the anionic resin and of the cationic resin.

6. The method according to claim 1 wherein the aqueous solution comprises $Ca^{2+}$ and $Mg^{2+}$ ions, $Cl^-$ anions, $Na^+$ and $K^+$ cations and anions selected from the group consisting of phosphate anions, anions from organic acids able to form complexes with the $Ca^{2+}$ and $Mg^{2+}$ ions and their mixtures.

7. The method according to claim 1, in which the aqueous solution further comprises monovalent metal cations, wherein the monovalent metal cation forming the counter-ion of the cationic resin is of the same type as the monovalent metal cations contained in the aqueous solution.

8. A method of decalcification of an aqueous solution of whey or whey permeate comprising multivalent cations $Ca^{2+}$ and $Mg^{2+}$ and anions selected from the group consisting of phosphates or anions from organic acids able to form complexes with $Ca^{2+}$ and $Mg^{2+}$ ions, the method consisting of first, replacing at least a part of said anions able to form complexes of the aqueous solution with monovalent anions not able to form such complexes, the first replacing step comprising processing of said aqueous solution by a strong anionic resin of which the counter-ion is a monovalent anion not able to form complexes with said multivalent cations, and second, replacing at least a part of said multivalent cations of the aqueous solution with monovalent metal cations by treatment of said aqueous solution by a strong cationic resin of which the counter-ion is a monovalent metal cation, wherein the second replacing step is performed on the aqueous solution having undergone the first replacing step.

9. The method according to claim 8, in which said aqueous solution further comprises monovalent anions not able to form complexes with said multivalent cations, wherein said monovalent anion forming the counter-ion of the anionic resin is of the same type as the monovalent anions contained in the aqueous solution.

10. The method according to claim 8, in which the aqueous solution further comprises monovalent metal cations, wherein the monovalent metal cation which is the counter-ion of the cationic resin is of the same type as the monovalent metal cations contained in the aqueous solution.

11. The method according to claim 8, wherein the aqueous solution comprises $Ca^{2+}$ and $Mg^{2+}$ ions, $Cl^-$ anions, $Na^+$ and $K^+$ cations and anions selected from the group consisting of phosphate anions, anions from organic acids able to form complexes with the $Ca^{2+}$ and $Mg^{2+}$ ions and their mixtures.

12. A method of decalcification of an aqueous solution of whey or whey permeate comprising multivalent cations $Ca^{2+}$ and $Mg^{2+}$ and anions able to form complexes with at least a part of said multivalent cations, the method consisting of first, replacing at least a part of said anions able to form complexes of the aqueous solution with monovalent anions not able to form such complexes, the first replacing step comprising processing of said aqueous solution by a strong anionic resin of which the counter-ion is a monovalent anion not able to form complexes with said multivalent cations, and second, replacing at least a part of said multivalent cations of the aqueous solution with monovalent metal cations by treatment of said aqueous solution by a strong cationic resin of which the counter-ion is a monovalent metal cation, wherein the second replacing step is performed on the aqueous solution having undergone the first replacing step, and a further step comprising regenerating the anionic resin and/or the cationic resin by means of a regeneration agent comprising an aqueous solution comprising a dissolved salt of which the cation is of the same type as the monovalent metal cation forming the counter-ion of the cationic resin and/or of which the anion is of the same type as the monovalent anion forming the counter-ion of the anionic resin.

13. The method according to claim 12, wherein the aqueous solution of whey or whey permeate comprises $Ca^{2+}$ and $Mg^{2+}$ ions, $Cl^-$ anions, $Na^+$ and $K^+$ cations and anions selected from the group consisting of phosphate anions, anions from organic acids able to form complexes with the $Ca^{2+}$ and $Mg^{2+}$ ions and their mixtures.

14. The method according to claim 1 wherein the monovalent anion non-able to form complexes with said multivalent cations is $Cl^-$.

15. The method according to claim 8 wherein the monovalent anion non-able to form complexes with said multivalent cations is $Cl^-$.

16. The method according to claim 12 wherein the monovalent anion non-able to form complexes with said multivalent cations is $Cl^-$.

17. The method according to claim 6 wherein the monovalent anion forming the counter-ion of the anionic resin is a $Cl^-$ anion and the monovalent cation forming the counter-ion of the cationic resin is a $Na^+$ or $K^+$ cation, and the regeneration agent is an aqueous solution of NaCl or an aqueous effluent containing $Na^+$ and/or $K^+$ and $Cl^-$ ions.

18. The method according to claim 13 wherein the monovalent anion forming the counter-ion of the anionic resin is a $Cl^-$ anion and the monovalent cation forming the counter-ion of the cationic resin is a $Na^+$ or $K^+$ cation, and the regeneration agent is an aqueous solution of NaCl or an aqueous effluent containing $Na^+$ and/or $K^+$ and $Cl^-$ ions.

\* \* \* \* \*

UNITED STATES PATENT AND TRADEMARK OFFICE
CERTIFICATE OF CORRECTION

PATENT NO. : 8,501,252 B2 Page 1 of 1
APPLICATION NO. : 10/526827
DATED : August 6, 2013
INVENTOR(S) : Marc-Andrè Theoleyre It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 950 days.

Signed and Sealed this

Fifteenth Day of September, 2015

Michelle K. Lee
*Director of the United States Patent and Trademark Office*